(12) United States Patent
Breau et al.

(10) Patent No.: US 8,589,590 B1
(45) Date of Patent: Nov. 19, 2013

(54) SELECTING AN ADDRESS PROVIDER USING A DYNAMIC INDICATOR

(75) Inventors: Jeremy R. Breau, Kansas City, MO (US); Ray R. Doerr, Gardner, KS (US); John E. Belser, Olathe, KS (US); Gary Rieschick, East Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 671 days.

(21) Appl. No.: 11/852,649

(22) Filed: Sep. 10, 2007

(51) Int. Cl.
| | |
|---|---|
| *G06F 11/00* | (2006.01) |
| *H04W 4/00* | (2009.01) |
| *H04H 20/67* | (2008.01) |
| *G06F 15/16* | (2006.01) |
| *G06F 15/177* | (2006.01) |
| *G06F 15/173* | (2006.01) |
| *H04L 29/06* | (2006.01) |
| *H04L 9/32* | (2006.01) |

(52) U.S. Cl.
USPC ........... 709/245; 370/217; 370/244; 370/248; 370/252; 370/313; 370/328; 370/331; 370/338; 370/389; 709/219; 709/220; 709/226; 709/227; 709/230; 709/231; 709/250; 713/161; 713/168; 713/181

(58) Field of Classification Search
None
See application file for complete search history.

(56) References Cited

U.S. PATENT DOCUMENTS

| | | | |
|---|---|---|---|
| 5,708,655 A * | 1/1998 | Toth et al. ................... 370/313 |
| 6,246,670 B1 * | 6/2001 | Karlsson et al. .............. 370/244 |
| 6,469,998 B1 * | 10/2002 | Burgaleta Salinas et al. 370/338 |
| 6,799,204 B1 * | 9/2004 | Baba et al. ................... 709/220 |
| 6,813,638 B1 * | 11/2004 | Sevanto et al. ............... 709/227 |
| 7,065,067 B2 * | 6/2006 | Song et al. ................... 370/338 |
| 7,069,015 B2 * | 6/2006 | Veerepalli et al. ............ 455/453 |
| 7,099,944 B1 * | 8/2006 | Anschutz et al. ............. 709/227 |
| 7,382,748 B1 * | 6/2008 | Bharatia et al. .............. 370/331 |
| 7,409,549 B1 * | 8/2008 | Leung et al. ................. 713/168 |
| 7,447,162 B1 * | 11/2008 | Leung et al. ................. 370/252 |
| 7,463,593 B2 * | 12/2008 | Pohlabel et al. .............. 370/252 |
| 2002/0114323 A1 * | 8/2002 | Chowdhury et al. ......... 370/352 |
| 2003/0224788 A1 * | 12/2003 | Leung et al. ............... 455/435.1 |
| 2003/0229697 A1 * | 12/2003 | Borella ........................ 709/226 |
| 2004/0184420 A1 * | 9/2004 | Xu et al. ...................... 370/328 |
| 2006/0036866 A1 * | 2/2006 | Nagendra et al. ............ 713/181 |
| 2006/0072759 A1 * | 4/2006 | Gundavelli et al. .......... 380/270 |
| 2006/0126613 A1 * | 6/2006 | Zweig .......................... 370/389 |
| 2007/0174477 A1 * | 7/2007 | Bostick et al. ............... 709/231 |
| 2007/0192437 A1 * | 8/2007 | Wang et al. .................. 709/219 |
| 2007/0201479 A1 * | 8/2007 | Ishiyama et al. ............. 370/392 |
| 2007/0230333 A1 * | 10/2007 | Kakiuchi ..................... 370/217 |
| 2007/0237141 A1 * | 10/2007 | Marchese .................... 370/389 |

(Continued)

FOREIGN PATENT DOCUMENTS

WO   WO/2007/007856   *   1/2007

OTHER PUBLICATIONS

Internet RFC/STD/FYI/BCP Archives; RFC 4433 (RFC4433) "Mobile IPv4 Dynamic Home Agent (HA) Assignment," 21 pages, http://www.faqs.org/rfcs/rfc4433.html.

*Primary Examiner* — Ario Etienne
*Assistant Examiner* — Ho Shiu (57) ABSTRACT

A method and system are provided to select address providers that provide mobile internet protocol devices with addresses for communication. An embodiment of the method includes obtaining an address request having a dynamic indicator. Upon obtaining an address request with a dynamic indicator, associating the dynamic indicator with one or more address providers based on the dynamic indicator. The address request is then communicated to one of the address providers associated with the dynamic indicator.

8 Claims, 5 Drawing Sheets

(56) References Cited

U.S. PATENT DOCUMENTS

| | | | |
|---|---|---|---|
| 2008/0002684 A1* | 1/2008 | Kumazawa et al. | 370/389 |
| 2008/0039079 A1* | 2/2008 | Iyer et al. | 455/432.1 |
| 2008/0062997 A1* | 3/2008 | Nix | 370/395.2 |
| 2009/0019181 A1* | 1/2009 | Fang et al. | 709/245 |
| 2009/0080387 A1* | 3/2009 | Dell'Uomo et al. | 370/338 |

* cited by examiner

SELECTING AN ADDRESS PROVIDER USING A DYNAMIC INDICATOR

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

The present invention is defined by the claims below. Embodiments of the present invention provide a system and method for, among other things, selecting address providers that provide mobile internet protocol devices with addresses to use for communication. The present invention has several practical applications in the technical arts including selecting an address provider that is associated with the dynamic indicator presented within an address request. Selecting an address provider based on an associated dynamic indicator may optimize the opportunity for obtaining an address that a mobile internet protocol device may use for communication.

In a first illustrative aspect, one or more computer-readable media having computer-executable instructions embodied thereon that, when executed perform a method for selecting address providers that provide mobile internet protocol devices with addresses to use for communication is provided. The method includes obtaining an address request having a dynamic indicator, wherein the dynamic indicator comprises a primary dynamic indicator or a secondary dynamic indicator; associating the dynamic indicator with one or more address providers based on the dynamic indicator; and communicating the address request to one of the one or more address providers associated with the dynamic indicator.

In a second aspect, one or more computer-readable media having computer-executable instructions embodied thereon that, when executed perform a method for selecting address providers that provide mobile internet protocol devices with addresses is provided. The method includes communicating an address request having a first dynamic indicator; and receiving an address reply in response to the address request, wherein when the address reply indicates a failure, communicating an address request having a second dynamic indicator.

In a final illustrative aspect, an improved address-provider selector capable of selecting an address provider that provides mobile internet protocol devices with internet protocol addresses for data communications is provided. The improved address-provider selector includes means for obtaining an address request having a first dynamic indicator; means for associating the first dynamic indicator with one or more first address providers; means for assigning the address request to one of the one or more first address providers associated with the first dynamic indicator; and means for communicating the address request to the assigned address provider.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| CD-ROM | Compact Disk Read Only Memory |
| DVD | Digital Versatile Discs |
| EEPROM | Electrically Erasable Programmable Read Only Memory |
| FA | Foreign Agent |
| GPS | Global Positioning System |
| HA | Home Agent |
| IP | Internet Protocol |
| MIP | Mobile Internet Protocol |
| MP3 | MPEG-1 Audio Layer 3 |
| PDA | Personal Digital Assistant |
| RAM | Random Access Memory |
| RF | Radio Frequency |
| ROM | Read Only Memory |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
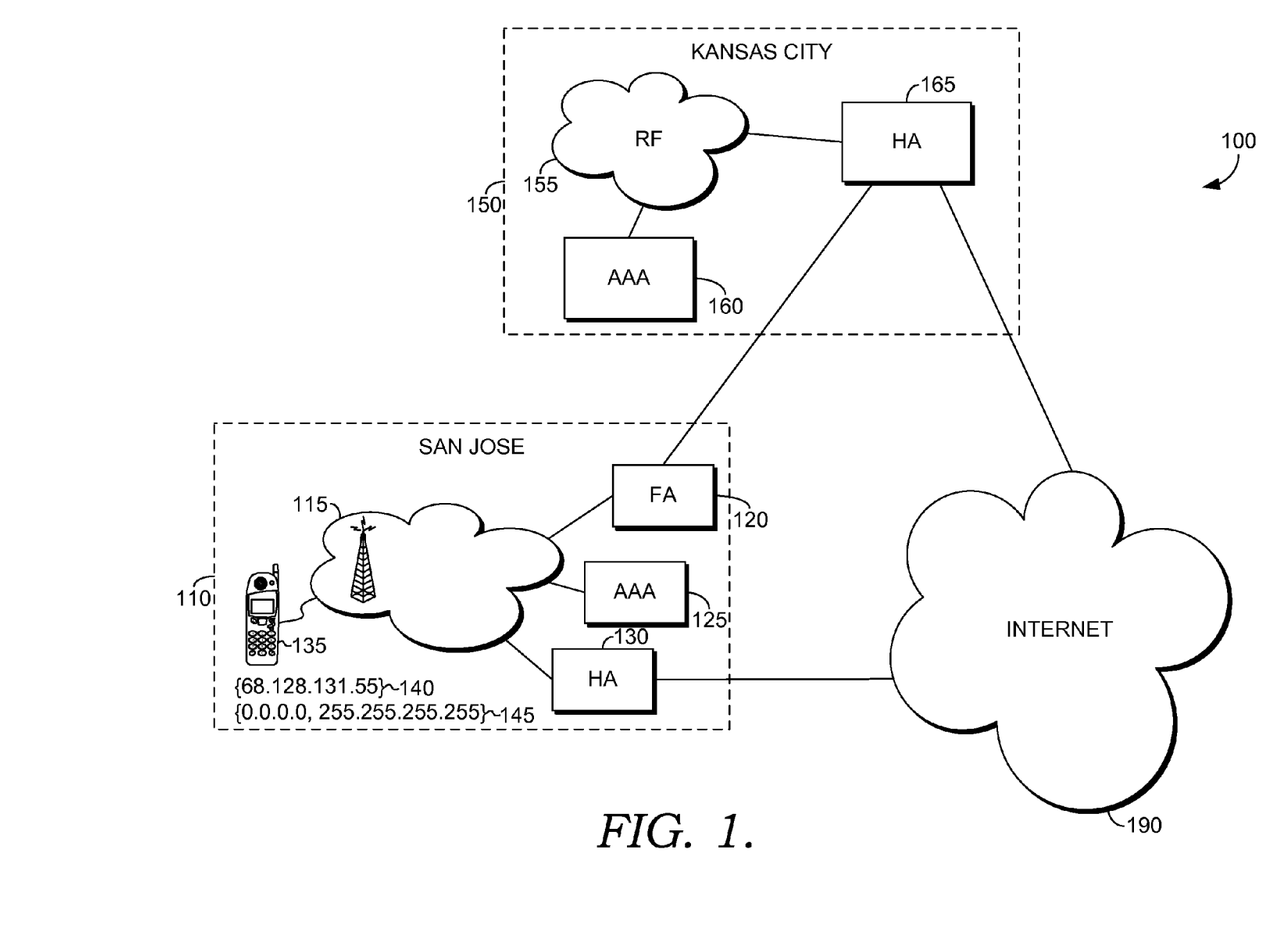
FIG. 1 is a schematic view of an exemplary wireless mobile internet protocol communications environment suitable for use in implementing the present invention.

Referring initially to FIG. 1 in particular, an exemplary wireless mobile internet protocol (MIP) network environment 100 is depicted with a first wireless area 110, a second wireless area 150, and the Internet 190. Using a MIP network environment, MIP devices may change the point-of-attachment to the Internet 190 without changing the IP address. The first wireless area 110 includes a radio frequency (RF) area 115, an FA 120, an AAA 125, a HA 130, and a mobile device 135. Mobile device 135 may have IP addresses 140 or 145 encoded into it. The second wireless area 150 may be similar to first wireless area 110. The second wireless area 150 include an RF area 155, an AAA 160, and a HA 165. Both wireless areas 110 and 150 may represent geographic areas such as cities, metropolitan areas, counties, etc. Different components may be included in first and second wireless areas 110 and 150 than those that are shown. For illustrative purposes here, a subset of devices are illustrated to aid in the explanation of the current state of the art as well as the implementation of the present invention. So, for purposes here, first and second wireless areas 110 and 150 are shown coupled with Internet 190 through their respective HAs 130 and 165.

As discussed above, a user desiring to connect to Internet 190 with mobile device 135 could do so using a static HA assignment approach. In this case, mobile device 135 might have IP address 140 encoded into it signifying an association with a wireless home area. For our example here, we assume mobile device 135 has second wireless area 150 as its home area. Second wireless area 150 is identified as Kansas City. Mobile device 135 may represent a user that is traveling in another wireless area, currently first wireless area 110, identified as San Jose. The user, with mobile device 135, desires to connect to Internet 190. Because mobile device 135 has IP address 140, first wireless area 110 recognizes that mobile device 135 is not one of its own mobile devices. Therefore, FA 120 uses IP address 140 to create a communication tunnel back to mobile device 135's home area to HA 165. HA 165 establishes a connection to Internet 190 to enable mobile device 135 to connect to Internet 190. For purposes here, the explanation of the static HA assignment has been simplified to illustrate the inefficient use of backhauling a connection of a mobile device back to its wireless home area in order to establish a communication connection to the Internet. As can be seen, if thousands of these connections are created, congestion and overload conditions can easily occur across various wireless networks.

Continuing with the example above, a user desiring to connect to Internet 190 with mobile device 135 could also do so using a dynamic HA assignment. In this case, rather than having IP address 140 embedded into mobile device 135, IP address 145 might be embedded into mobile device 135. As shown, IP address 145 illustrates two IP addresses which, if used, would signify to another device that mobile device 135 should not establish a backhaul connection back to its home wireless areas. Instead, the local wireless area should try to establish the necessary connections to enable mobile device 135 to connect to Internet 190. In our scenario, the presence of IP address 145 in mobile device 135 indicates that dynamic HA assignment shall occur. Therefore, FA 120 is not used to create a communication tunnel back to HA 165. Instead, FA 120 interacts with AAA 125 to select an HA 130 to provide a user with Internet 190. In this way, FA 120 does not have to make a backhaul connection to mobile device 135's home wireless area before connecting to the Internet 190. Such a wireless MIP network utilizing the dynamic HA assignment approach provides an exemplary communication environment, in accordance with an embodiment of the present invention.

Figure 2:
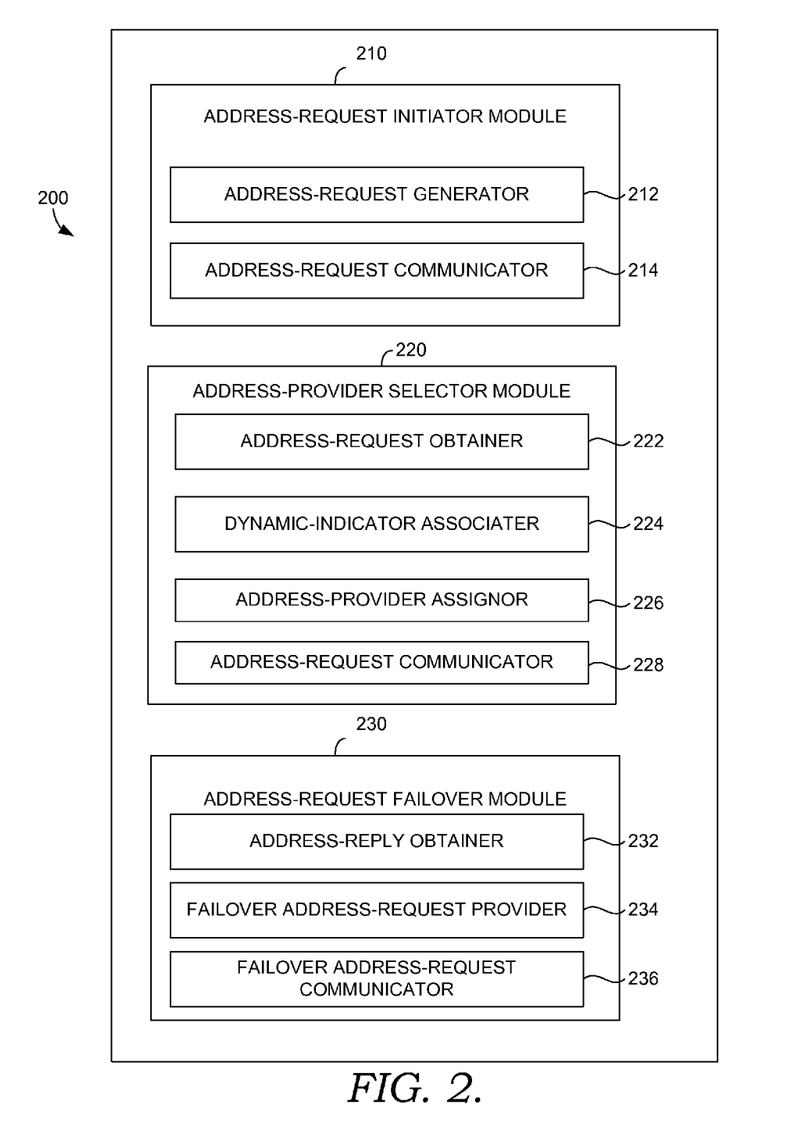
FIG. 2 is a block diagram depicting an exemplary computing system for selecting an address provider, in accordance with an embodiment of the present invention.

Referring now to FIG. 2, an exemplary computing system 200 for selecting address providers within a wireless MIP network that utilizes the dynamic assignment approach is illustrated. As used herein, an address provider provides an address so that a MIP device may use the address for communication. In embodiments, an address provider may comprise a HA. A MIP device refers to any device that utilizes mobile internet protocol to communicate with other devices. Such MIP devices may include, for example, a mobile telephone, a portable digital assistant (PDA), a laptop, a global positioning system (GPS), an MP3 player, or any other portable device.

Often times, in a wireless MIP network utilizing the dynamic assignment approach, an address provider, such as a HA, may not be optimally operating. By way of example only, the address provider may incur a loss of connectivity, a full capacity, an unavailability of addresses to assign, unavailable point of attachment, and the like. Accordingly, the address provider may fail to provide an address, such as an IP address, for the MIP device to use for communication. Notwithstanding the failure of an address provider to provide an address, the deficient address provider may be repeatedly selected to provide an address for a MIP device to communicate. For example, assume a FA receives a request for an address that indicates a preference for dynamic HA assignment. Thereafter, the FA may select a deficient HA to provide an address for a MIP device. A deficient HA may refer to an HA that fails to provide an address. Such a deficient HA may include a defective HA or an HA that does not receive requests for addresses. Assume further that the selected HA fails to provide an address and the FA again receives an address request indicating a dynamic HA assignment. As such, the same deficient HA may, again, be selected by the FA to provide an address for the MIP device. Because the FA may select any HA without restriction, an HA that fails to provide an address may be repeatedly selected. As such, an MIP device desiring to communicate via a network may repetitively receive errors.

As shown in FIG. 2, an exemplary computing system 200 includes an address-request initiator module 210, an address-provider selector module 220, and an address-request failover module 230. In some embodiments, one or more of the illustrated modules may be implemented as one or more stand-alone applications. In other embodiments, one or more of the illustrated modules may be integrated directly into the operating system or an application of a server and/or an end-user device. It will be understood by those of ordinary skill in the art that the modules illustrated in FIG. 2 are exemplary in nature and in number and should not be construed as limited. Any number of modules may be employed to achieve the desired functionality within the scope of embodiments hereof. Further, modules may be located on any number of servers or computing devices.

The address-request initiator module 210 is configured to initiate a request for an address for a session. As used herein, the term "address" refers to an address that enables a MIP device to communicate over a computer network. Such an address may be an IP address. In some embodiments, a session may refer to a successful binding of a MIP device to an address-provider selector module (e.g., a FA). The address-request initiator module 210 may utilize an address request to request an address. For example, the address-request initiator module 210 may use an address request to request an address from a HA. In one embodiment, the address-request initiator module 210 may reside on a MIP device.

In one embodiment, an address-request initiator module 210 may include the following components: an address-request generator 212 and an address-request communicator 214. In some embodiments, one or more of the illustrated components may be implemented as one or more stand-alone applications. In other embodiments, one or more of the illustrated components may be integrated directly into the operating system or an application of a server and/or an end-user device. It will be understood by those of ordinary skill in the art that the components illustrated in FIG. 2 are exemplary in nature and in number and should not be construed as limited. Any number of components may be employed to achieve the desired functionality within the scope of embodiments hereof. Further, components may be located on any number of servers or computing devices.

The address-request generator 212 is configured to generate an initial address request for a session. As used herein, an address request provides a request for an address, such as an IP address, that enables communication over a computer network. An address request may comprise, for example, a registration request or a MIP registration request. In one embodiment, an address request may include, among other things, a dynamic indicator that indicates the desire for dynamic address-provider assignment (e.g., dynamic HA assignment). Such a dynamic indicator may be an IP address, such as an all-zeros address, (e.g., 0.0.0.0) or an all-ones address (e.g., 255.255.255.255). An all-zeros address refers to an IP address of 0.0.0.0. where each of the octets, i.e., eight bit sections, in binary notation include all zeros (e.g., 00000000.00000000.00000000.00000000). An all-ones address refers to an IP address of 255.255.255.255 where each of the octets in binary notation include all ones (e.g., 11111111.11111111.11111111.11111111). In embodiments, an address request may include an address-provider field. Rather than identifying an address provider (e.g., an IP address of the address provider, such as 2.2.2.2) within the address provider field, the address-request generator 212 may provide a dynamic indicator within the address-provider field to indicate the desire for a dynamic address-provider assignment. In addition to an address-provider field, an address request may also include other fields, such as a source-address field, a destination-address field, care-of-address fields, and the like.

In one embodiment, a dynamic indicator may be a primary dynamic indicator or a secondary dynamic indicator. A primary dynamic indicator may refer to a preferred dynamic indicator. A secondary dynamic indicator may refer to a subordinate dynamic indicator. In an embodiment having a primary dynamic indicator and a secondary dynamic indicator, the address-request generator 212 may generate an initial address request for a session utilizing the primary dynamic indicator. As such, each instance the address-request generator generates an initial address request for a session, a primary dynamic indicator, such as an all-zeros address, may be utilized. By way of example only, assume a primary dynamic indicator comprises an all-zeros address. Accordingly, the address-request generator 212 may generate an initial address request for a session having an all-zeros address (e.g., 0.0.0.0) populated within the address-provider field of the initial address request. In one embodiment, an all-zeros address may be a primary dynamic indicator, and an all-ones address may be a secondary dynamic indicator. In the alternative, an all-ones address may be a primary dynamic indicator, and an all-zeros IP address may be a secondary dynamic indicator.

In an alternative embodiment, the address-request generator 212 may utilize any dynamic indicator to indicate the desire for dynamic address-provider assignment. For example, in one instance, the address-request generator 212 may utilize an all-zeros IP address as the dynamic indicator and, as such, populate the address-provider field with 0.0.0.0. In a subsequent instance, the address-request generator 212 may utilize an all-ones IP address as the dynamic indicator and, accordingly, populate the address-provider field with 255.255.255.255.

The address-request generator 212 may generate an initial address request for a session automatically or based on an indication (e.g., a user request for an address). Where an address request is automatically generated, the generation may occur upon the occurrence of a time, a time period, or an event. Such an event may include, for example, a computer startup, a computer logon, an application logon, a disconnected internet connection, and the like. Alternatively, a user or an application may indicate a desire to request an address to enable communication over a network. In an instance where a user provides an indication to generate an address request, the user may select an icon, or the like. In some cases, the user may be required to enter a username, a password, or a combination thereof.

The address-request communicator 214 is configured to communicate address requests. In one embodiment, the address-request communicator 214 may communicate address requests to an address-provider selector, such as a FA. An address-provider selector, as used herein, selects an address provider, such as a HA, to provide an address for communicating within a network. In one embodiment, an address-provider selector may comprise a FA, an AAA, or a combination thereof.

The address-provider selector module 220 is configured to select one or more address providers. The address-provider selector module 220 may reside, for example, within a FA, an AAA, or a combination thereof. In one embodiment, the address-provider selector module 220 may include the following components: an address-request obtainer 222, a dynamic-indicator associater 224, an address-provider assignor 226, and an address-request communicator 228. In some embodiments, one or more of the illustrated components may be implemented as one or more stand-alone applications. In other embodiments, one or more of the illustrated components may be integrated directly into the operating system or an application of a server and/or an end-user device. It will be understood by those of ordinary skill in the art that the components illustrated in FIG. 2 are exemplary in nature and in number and should not be construed as limited. Any number of components may be employed to achieve the desired functionality within the scope of embodiments hereof. Further, components may be located on any number of servers or computing devices.

The address-request obtainer 222 is configured to obtain address requests. Address-request obtainer 222 may obtain address requests by receiving, retrieving, identifying, determining, or generating the address requests. In one embodiment, such an address request may be received from an address requester module, such as address-request initiator module 210 or address-request failover module 230, residing on a MIP device.

The dynamic-indicator associater 224 is configured to associate a dynamic indicator within an address request with one or more address providers. The dynamic-indicator associater 224 may utilize a lookup table or an algorithm to associate dynamic indicators with one or more address providers. In embodiments, each dynamic indicator may be associated with one or more distinct address providers. For instance, a primary dynamic indicator may be associated with a primary address provider having an IP address of 2.2.2.2, and a secondary dynamic indicator may be associated with a secondary address provider having an IP address of 3.3.3.3. In some embodiments, dynamic-indicator associater 224 may also be configured to identify dynamic indicators within address requests so that dynamic-indicator associater 224 may, thereafter, associate the dynamic indicator with one or more address providers.

In one embodiment, a dynamic indicator may be associated with a single address provider. For example, a primary dynamic indicator may be associated with a single address provider, such as a primary address provider. A primary address provider may refer to an address provider associated with a primary dynamic indicator (e.g., the primary address provider is selected when a primary dynamic indicator is obtained). By way of further example, an all-ones address dynamic indicator may be associated with a specific address provider, such as address provider having an IP address of 2.2.2.2. In such an instance, each instance an address request having an all-ones address dynamic indicator is obtained by address-request obtainer 222, the address request may be communicated to the address provider having an IP address of 2.2.2.2.

In another embodiment, a dynamic indicator may be associated with multiple address providers. For example, a primary dynamic indicator may be associated with a plurality of address providers, such as a set of primary address providers. By way of further example, an all-ones address dynamic indicator may be associated with a set of address providers, such as a first address provider having an IP address of 2.2.2.1, a second address provider having an IP address of 2.2.2.2, and a third address provider having an IP address of 2.2.2.3. In such an embodiment, an address request having an all-ones address dynamic indicator (e.g., 255.255.255.255) obtained by address-request obtainer 222 may be communicated to any one of the associated address providers. Accordingly, in one instance, such an address request may be communicated to a first address provider having an IP address of 2.2.2.1. In a later instance, such an address request may be communicated a second address provider having an IP address of 2.2.2.2.

The address-provider assignor 226 is configured to assign the address request to an address provider. The address-provider assignor 226 may assign the address request to one of the one or more address providers associated with the dynamic indicator presented within the address request. By way of example only, assume an address request having an all-zeros IP address dynamic indicator is obtained by address-request obtainer 222 and associated with a set of address providers including a first address provider having an IP address of 2.2.2.1 and a second address provider having an IP address of 2.2.2.2. In such a case, the address-provider assignor 226 may assign the address request to any one of the address providers associated with the dynamic indicator, such as the first address provider having an IP address of 2.2.2.1.

Where a plurality of address providers are associated with the dynamic indicator, in one embodiment, the address-provider assignor 226 may randomly assign the address request to one of the associated address providers. Alternatively, the address-provider assignor 226 may be configured to selectively assign the address request to one of the associated address providers via an algorithm, a lookup table, or the like. For example, the address-provider assignor 226 may assign the address request to the associated address provider having the least utilization, the most addresses available for communication, or the like.

In one embodiment, the address-provider assignor 226 may assign the address request to an address provider that was not previously utilized to request a session. As such, where the same group of address providers is associated with the dynamic indicator in different instances (e.g., first and third address requests having a primary dynamic indicator) the dynamic indicator may be assigned with a different address provider or alternating address provider within the group of addresses in each instance. In such an embodiment, the address providers assigned to the address requests may be monitored so as to avoid repetitively assigning an address request to a particular address provider within a group of address providers. An address-provider selector module or other module/component may monitor the assigned address providers.

Assigning the address request to an address provider may include, for example, adding to or modifying of the address request. In such a case, an address-provider identifier, such an IP address of the address-provider, may be included within the address request. In one embodiment, such an address-provider identifier may be added to the address request. Alternatively, the address request may be modified such that an address-provider identifier may replace, for example, the destination address within the destination-address field of the address request.

The address-request communicator 228 is configured to communicate the address request to an address provider such as, for example, a HA. In one embodiment, the address-request communicator 228 communicates the address request to the address provider assigned by address-provider assignor 226.

One skilled in the art will recognize that the invention includes an improved address-provider selector (e.g., FA) capable of selecting an address provider that provides mobile internet protocol devices with internet protocol addresses for data communications is provided. The improved address-provider selector includes means for obtaining an address request having a first dynamic indicator; means for associating the first dynamic indicator with one or more first address providers; means for assigning the address request to one of the one or more first address providers associated with the first dynamic indicator; and means for communicating the address request to the assigned address provider. In one embodiment, the means for obtaining an address request having a first dynamic indicator may comprise an address-request obtainer 222. In one embodiment, the means for associating the first dynamic indicator with one or more first address providers may comprise a dynamic-indicator associater 224. In one embodiment, the means for assigning the address request to one of the one or more first address providers associated with the first dynamic indicator may comprise the address-provider assignor 226. In one embodiment, the means for communicating the address request to the assigned address may comprise an address-request communicator.

In response to receiving and processing the address request, the address provider, such as a HA, may communicate an address reply. An address reply, as used herein, comprises a response to an address request. Such an address reply may include an address for use by the MIP device to communicate. Alternatively, the address reply may include an error code indicating that the address provider was unable to obtain an address for use by the MIP device to communicate. In embodiments, the address provider may communicate the address reply to an address-provider selector (e.g., a FA or AAA, an MIP device, or the like). In some instances, an address provider may fail to communicate an address reply.

The address-request failover module 230 is configured to provide an address request, if necessary. The address-request failover module 230 may, for example, reside within an MIP device. In one embodiment, the address-request failover module 230 may include the following components: an address-reply obtainer 232, a failover address-request provider 234, and a failover address-request communicator 236. In some embodiments, one or more of the illustrated components may be implemented as one or more stand-alone applications. In other embodiments, one or more of the illustrated components may be integrated directly into the operating system or an application of a server and/or an end-user device. It will be understood by those of ordinary skill in the art that the components illustrated in FIG. 2 are exemplary in nature and in number and should not be construed as limited. Any number of components may be employed to achieve the desired functionality within the scope of embodiments hereof. Further, components may be located on any number of servers or computing devices.

The address-reply obtainer 232 is configured to obtain an address reply. Such an address reply may be provided by an address provider (e.g., a HA). One skilled in the art will recognize that an address reply obtained by address-reply obtainer 232 may be received from an address provider (e.g., a HA) or an address-provider selector (e.g., a FA). In an embodiment where the address reply is received from an address-provider selector, the address reply may be communicated from an address provider to the address-provider selector. The address-provider selector (e.g., a FA) may then relay the address reply to the address-reply obtainer 232, such as an address-reply obtainer 232 residing within an MIP device.

The address reply may include, as previously mentioned, an address for use by the MIP device to communicate or an error code indicating that the address provider failed to obtain an address for the MIP device to use for communication. In an instance where the address-reply obtainer 232 obtains an address reply having an address for use by the MIP device, the MIP device may utilize the address within the address reply to communicate over a network. In an instance where the address-reply obtainer 232 obtains an address reply having an error code, however, a failover address-request provider 234 may provide a failover address request to obtain an address for communication.

One skilled in the art will recognize that, in some instances, the address-reply obtainer 232 may not obtain an address reply. By way of example only, an address provider (e.g., HA) or an address-provider selector (e.g., FA) may fail to provide an address reply such that the address-reply obtainer 232 may not obtain the address reply. In such a case, the failover address-request provider 234 may provide a failover address request to obtain an address for communication. In one embodiment, the failover address-request provider 234 may provide such a failover address request upon an indication of a lapse (e.g., lapse indicator). A lapse indicator provides an indication that an address reply has not been obtained. Such a lapse indicator may be based on the occurrence of a specific time, a specific time duration, an event, or a combination thereof. For example, an indication of a lapse may be provided where an address reply was not obtained within five seconds after a prior address request was communicated. In one embodiment, the address-reply obtainer 232, the failover address-request provider 234, or another component may obtain such a lapse indicator. Obtaining a lapse indicator may include, for example, determining, receiving, retrieving, or identifying the lapse indicator.

The failover address-request provider 234 is configured to provide a failover address request. As used herein, a failover address request refers to an address request utilized upon the failure of an address provider to provide an address for communication. Such a failover address request provides a request for an address that enables communication over a computer network. The failover address-request provider 234 may generate a failover address request, modify the initial address request generated by, for example, address-request generator 212 such that a failover address request results, or modify the address reply such that a failover address request results.

A failover address request may comprise, for example, a registration request or a MIP registration request. In one embodiment, a failover address request may include, among other things, a dynamic indicator that indicates the desire for dynamic address-provider assignment (e.g., dynamic HA assignment). In embodiments, a failover address request may include an address-provider field. Rather than identifying an address provider (e.g., an IP address of the address provider, such as 2.2.2.2) within the address-provider field, the failover address-request provider 234 may provide a dynamic indicator within the address-provider field to indicate the desire for a dynamic address-provider assignment. In one embodiment, the failover address-request provider 234 may utilize a primary dynamic indicator (e.g., 0.0.0.0) and a secondary dynamic indicator (e.g., 255.255.255.255). In another embodiment, the failover address-request provider 234 may utilize any dynamic indicator to indicate the desire for dynamic address provider assignment. In addition to an address-provider field, a failover address request may also include other fields, such as a source address, a destination address, care-of-addresses, and the like.

The failover address-request provider 234 may generate a failover address request automatically or based on an indication. Where a failover address request is automatically generated, the generation may occur upon the occurrence of a time, time period, or event (e.g., the receipt of an address reply having an error or failing to obtain an address reply). Alternatively, a user or an application may indicate a desire to request an address to enable communication over a network.

In providing failover address requests, the failover address-request provider 234 may use a lookup table or an algorithm to determine a dynamic indicator to include with a failover address request. Because the dynamic indicator utilized in the initial address request generated by, for example, address-request generator 212 resulted in an error, such a lookup table or algorithm may be used to determine a different dynamic indicator to use in the failover address request. In one embodiment, the failover address-request provider 234 may identify, recognize, or determine the dynamic indicator used in the previous (e.g., initial, address request). In such an embodiment, the failover address-request provider 234 may then utilize a dynamic indicator that is unique from the dynamic indicator used in the previous address request. For example, assume an initial address request includes an all-zeros IP address dynamic indicator and the address-request obtainer 222 receives an error within the address reply. As such, the failover address-request provider 234 may recognize that the error was associated with the previously used dynamic indicator and, thereby, select to provide a failover address request having an all-ones IP address dynamic indicator.

In another embodiment, the failover address-request provider 234 may identify, recognize, or determine a failed initial address request. In such an embodiment, the failover address-request provider 234 may then default to a specific dynamic indicator. For example, in an embodiment that utilizes primary and secondary dynamic indicators, assume an initial address request includes a primary dynamic indicator (e.g., an all-zeros IP address) and the address-request obtainer 222 receives an error within the address reply. As such, the failover address-request provider 234 may recognize a failed initial address request and, thereby, select to provide a failover address request having a secondary dynamic indicator (e.g., an all-ones IP address).

The failover address-request communicator 236 is configured to communicate the failover address-request. In one embodiment, the failover address-request communicator 236 may communicate the failover address-request to an address-provider selector, such as a FA. One skilled in the art will recognize that failover address-request communicator 236 may be the same component as address-request communicator 214.

Figure 3:
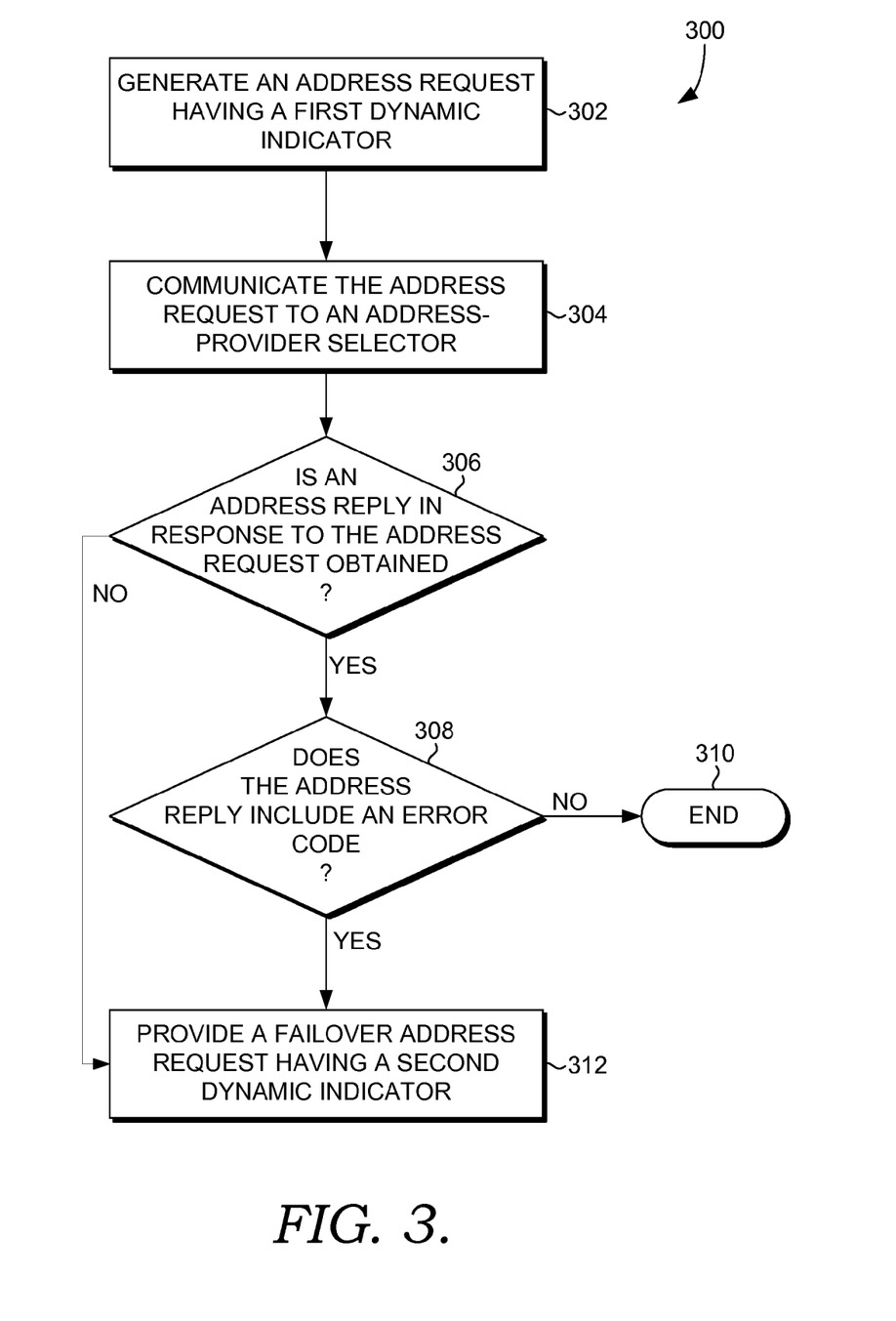
FIG. 3 is an exemplary flow diagram illustrating an exemplary method for providing an address request, in accordance with an embodiment of the present invention.

Turning now to FIG. 3, a flow diagram is shown illustrating a method 300 for providing address requests, in accordance with an embodiment of the present invention. Initially, as indicated at block 302, an address request having a first dynamic indicator is generated. Subsequently, at block 304, the address request is communicated to an address-provider selector. Such an address provider selector may comprise a FA. As indicated at block 306, it is determined if an address reply in response to the address request is obtained. If an address reply in response to the address request is not obtained, a failover address request having a second dynamic indicator is provided. This is indicated at block 312.

If, however, an address reply in response to the address request is obtained, it is determined, at block 308, if the address reply includes an error code. If it is determined that the address reply does not include an error code, the method ends at block 310. In one embodiment, upon obtaining a successful address, the FA may create a binding to the MIP device. If, however, it is determined that the address reply does include an error code, a failover address request having a second dynamic indicator is provided. This is indicated at block 312.

Upon providing a failover address request having a second dynamic indicator, iterations including blocks 304 through 312 may continue until the address reply is obtained and does not include an error code (e.g., an address is successfully obtained). One skilled in the art will recognize that each iteration may result in providing a failover address request having an alternating dynamic indicator (e.g., in a first instance an all-zeros dynamic indicator is provided, in a second instance an all-ones dynamic indicator is provided, in a third instance an all-zeros dynamic indicator is again provided). By way of example only, an address request having an all-zeros dynamic indicator may be generated at block 302 and communicated to an address-provider selector at block 304. At block 306, an address reply communicated in response to the address request may be obtained. Assuming the address reply includes an error code, a failover address request having an all-ones dynamic indicator may be provided at block 312. The failover address request may be communicated at block 304 to an address-provider selector. An address reply communicated in response to the failover address request may be obtained at block 306. Assuming the address reply includes an error code, a failover address request having an all-zeros dynamic indicator may be provided.

Figure 4:
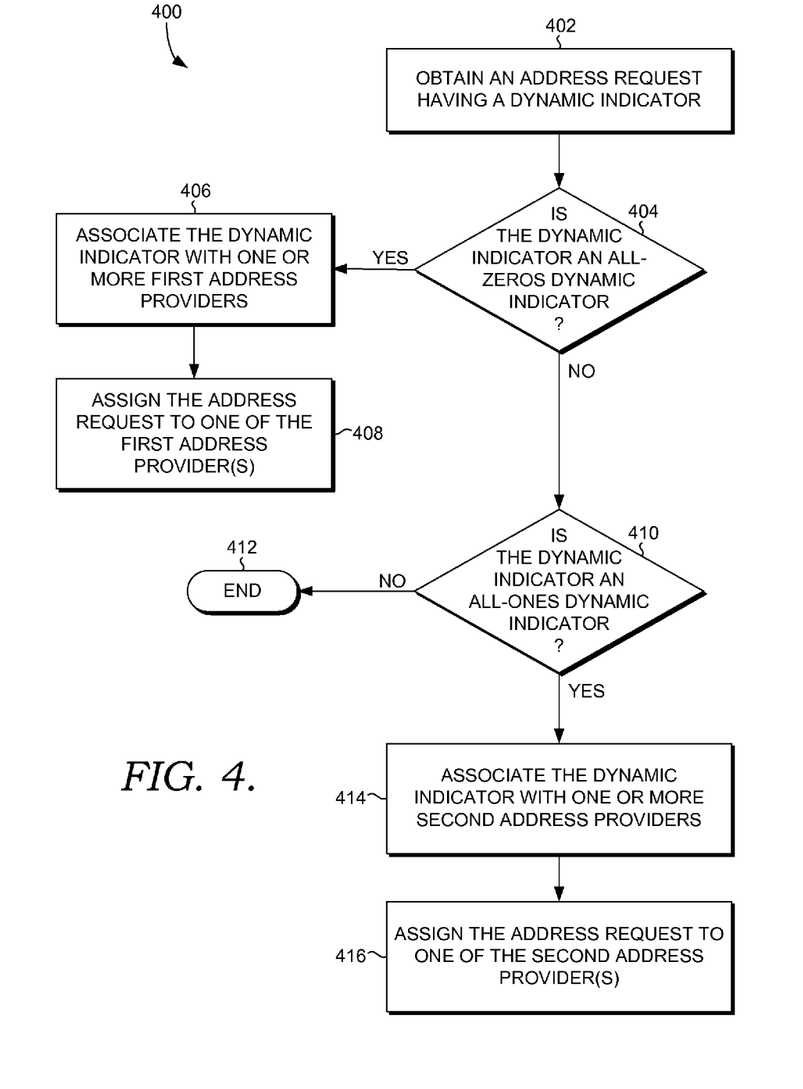
FIG. 4 is an exemplary flow diagram illustrating an exemplary method for selecting an address provider, in accordance with an embodiment of the present invention.

With reference to FIG. 4, a flow diagram is shown illustrating a method 400 for selecting an address provider, in accordance with an embodiment of the present invention. Initially, as indicated at block 402, an address request having a dynamic indicator is obtained. Subsequently, at block 404, it is determined if the dynamic indicator comprises an all-zeros IP address dynamic indicator. If it is determined that the dynamic indicator comprises an all-zeros IP address dynamic indicator, the dynamic indicator is associated with one or more first address providers at block 406. Thereafter, at block 408, the address request is assigned to one of the one or more first address providers.

Referring again to block 404, if it is determined that the dynamic indicator does not comprise an all-zeros IP address dynamic indicator, it is determined if the dynamic indicator comprises an all-ones IP address dynamic indicator. This is indicated at block 410. If it is determined that the dynamic indicator does not comprise an all-ones IP address dynamic indicator, the method ends at block 412. If, however, it is determined that the dynamic indicator does comprise an all-ones IP address dynamic indicator, the dynamic indicator is associated with one or more second address providers at block 414. Thereafter, at block 416, the address request is assigned to one of the one or more second address providers.

Figure 5:
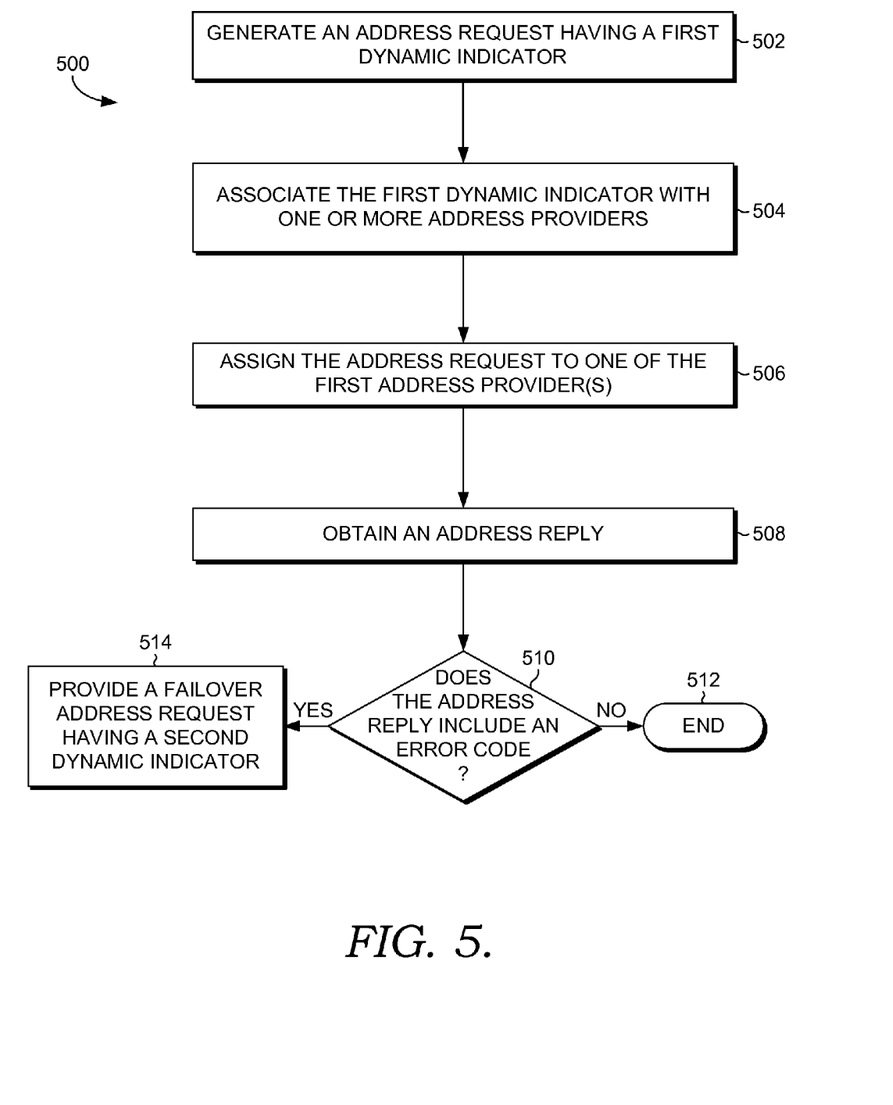
FIG. 5 is an exemplary flow diagram illustrating an exemplary method for providing an address request and selecting an address provider, in accordance with an embodiment of the present invention.

Turning now to FIG. 5, a flow diagram is shown illustrating a method 500 for providing address requests and selecting an address provider. Initially, as indicated at block 502, an address request having a first dynamic indicator is generated. Subsequently, at block 504, the first dynamic indicator is associated with one or more first address providers. The address request is assigned to one of the one or more first address providers. This is indicated at block 506. In response to the address request having a first dynamic indicator, an address reply is obtained at block 508. Thereafter, at block 510, it is determined if the address reply includes an error code. If it is determined that the address reply does not include an error code, the method ends at block 512. If, on the other hand, it is determined that the address reply includes an error code, a failover address request having a second dynamic indicator that is different from the first dynamic indicator is provided. This is indicated at block 514.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon that, when executed perform a method for selecting address providers that provide mobile internet protocol devices with addresses to use for communication, the method comprising:
   obtaining an address request from a mobile device, the address request having a dynamic indicator being selected from a plurality of dynamic indicators, wherein the dynamic indicator comprises a first dynamic indicator or a second dynamic indicator and indicates a desire for a dynamic home agent assignment, wherein the first dynamic indicator is different from the second dynamic indicator;
   associating the dynamic indicator with a plurality of home agents in accordance with the dynamic indicator within the address request, wherein
      (1) the dynamic indicator is associated with a first plurality of home agents within a home network when the dynamic indicator of the address request comprises the first dynamic indicator, and
      (2) the dynamic indicator is associated with a second plurality of home agents within the home network when the dynamic indicator of the address request comprises the second dynamic indicator;
   assigning the address request to one of the plurality of home agents associated with the dynamic indicator, wherein assigning the address request comprises populating the address request with an indication of the one of the plurality of home agents; and
   communicating the address request to the one of the plurality of home agents associated with the dynamic indicator.

2. The one or more computer-readable media of claim 1, wherein the first dynamic indicator comprises an all-zeros IP address dynamic indicator and the second dynamic indicator comprises an all-ones IP address dynamic indicator.

3. The one or more computer-readable media of claim 1, wherein the first dynamic indicator comprises a primary dynamic indicator and the second dynamic indicator comprises a secondary dynamic indicator.

4. The one or more computer-readable media of claim 1 further comprising identifying the dynamic indicator.

5. A method for selecting address providers that provide mobile internet protocol devices with addresses to use for communication, the method comprising:
   obtaining an address request having a dynamic indicator being selected from a plurality of dynamic indicators, wherein the dynamic indicator comprises a first dynamic indicator or a second dynamic indicator and indicates a desire for selecting an address provider for data communication, wherein the first dynamic indicator is different from the second dynamic indicator;
   associating the dynamic indicator with a plurality of address providers in accordance with the dynamic indicator within the address request, wherein
      (1) the dynamic indicator is associated with a first plurality of address providers within a foreign network when the dynamic indicator of the address request is the first dynamic indicator, and
      (2) the dynamic indicator is associated with a second plurality of address providers within the foreign network when the dynamic indicator of the address request is the second dynamic indicator;
   assigning the address request to one of the plurality of address providers associated with the dynamic indicator, wherein assigning the address request comprises populating the address request with an indication of the one of the plurality of address providers; and
   communicating the address request to the assigned address provider.

6. The method of claim 5, wherein the plurality of address providers comprise home agents.

7. The method of claim 5 further comprising obtaining an address reply.

8. The method of claim 5 further comprising identifying the dynamic indicator.

* * * * *